Sept. 7, 1926. 1,599,239
J. KNOX
MACHINE FOR BREAKING OR TEARING INTO LENGTHS HEMP, FIBER, AND THE LIKE
Filed March 2, 1925   5 Sheets-Sheet 5

Inventor-
James Knox,
by his Attorneys,
Howson & Howson

Patented Sept. 7, 1926.

1,599,239

UNITED STATES PATENT OFFICE.

JAMES KNOX, OF DALRY, SCOTLAND.

MACHINE FOR BREAKING OR TEARING INTO LENGTHS HEMP, FIBER, AND THE LIKE.

Application filed March 2, 1925, Serial No. 12,579, and in Great Britain December 24, 1924.

This invention comprises improvements in and relating to machines for breaking or tearing into lengths hemp fiber or strick, as it is termed, and the like.

My invention has particular reference to machines for this purpose embodying two groups of rollers, the one group being arranged to be continuously driven and the other group to be intermittently driven, the strick being passed from the one group of rollers to the other and broken or torn into lengths by the intermittent action of the first group and the continuous action of the second group.

My invention has primarily for its object to provide improved means whereby the intermittent motion is obtained.

A further object of my invention is to provide improvements whereby the length of the torn or broken pieces of fiber can be altered as desired.

A still further object of my invention is to provide a compact machine for the purpose set forth.

According to my invention, in a machine of the type set forth, the one group of rollers is arranged to be continuously driven, and the other group is driven by means of an endless flexible drive, for example a chain, arranged to be continuously driven and to intermittently act to drive the second group of rollers, means being provided to positively stop the rotation of the latter when not being driven.

The endless flexible drive is conveniently in the form of an endless chain having a projection or projections arranged to intermittently co-act with a star wheel or star wheels, which latter transmit its motion to the intermittently driven rollers.

A feature of my invention consists in providing adjustable idle sprocket wheels, jockey wheels or the like whereby the said projection or projections can be made to co-act with the star wheel to a greater or less extent and by this means the extent of the rotation of said intermittently driven rollers, and therefore also the length of fiber broken or torn, altered as desired.

The stopping of the intermittently driven rollers is conveniently effected by means of a cam actuated finger arranged to co-act with the star wheel or other member of the driven mechanism, said cam being arranged to operate the finger in accordance with the length of stick being broken or torn.

In order that my invention may be properly understood I have hereunto appended five explanatory sheets of drawings illustrating a preferred embodiment of my invention and whereon:—

Figure 1:
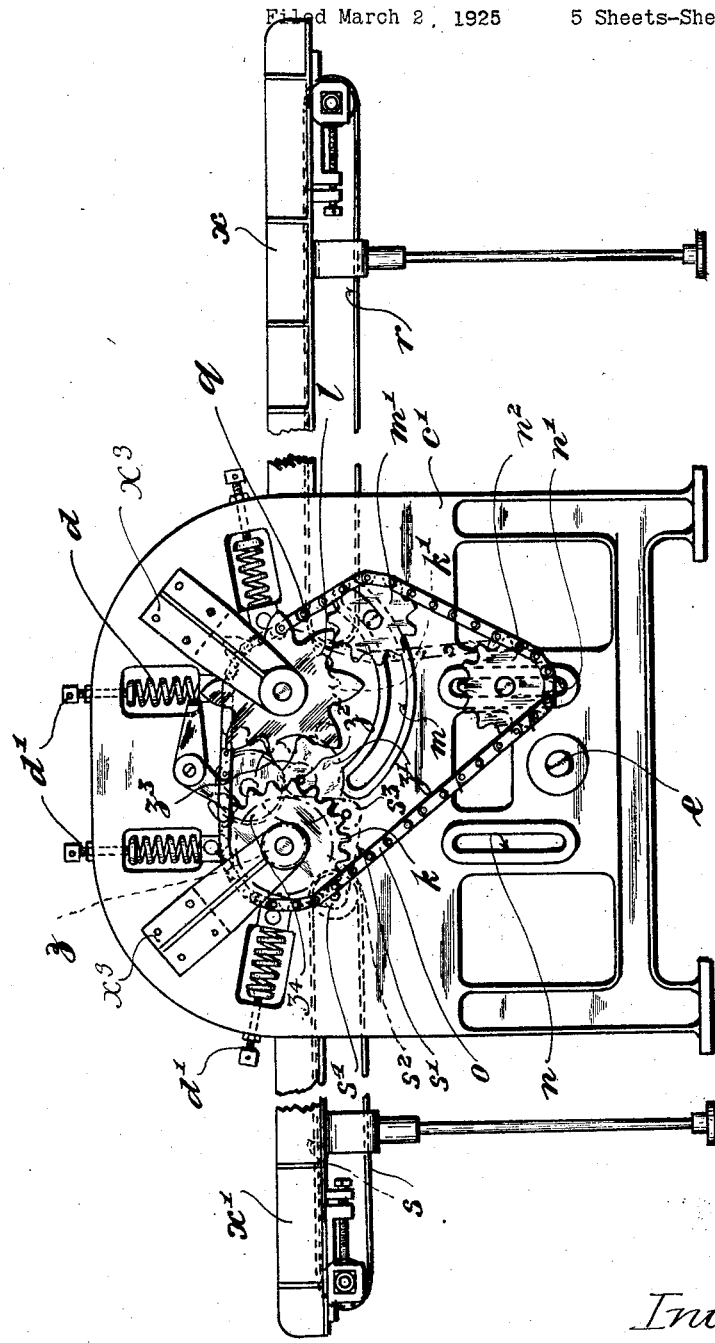
Figure 2:
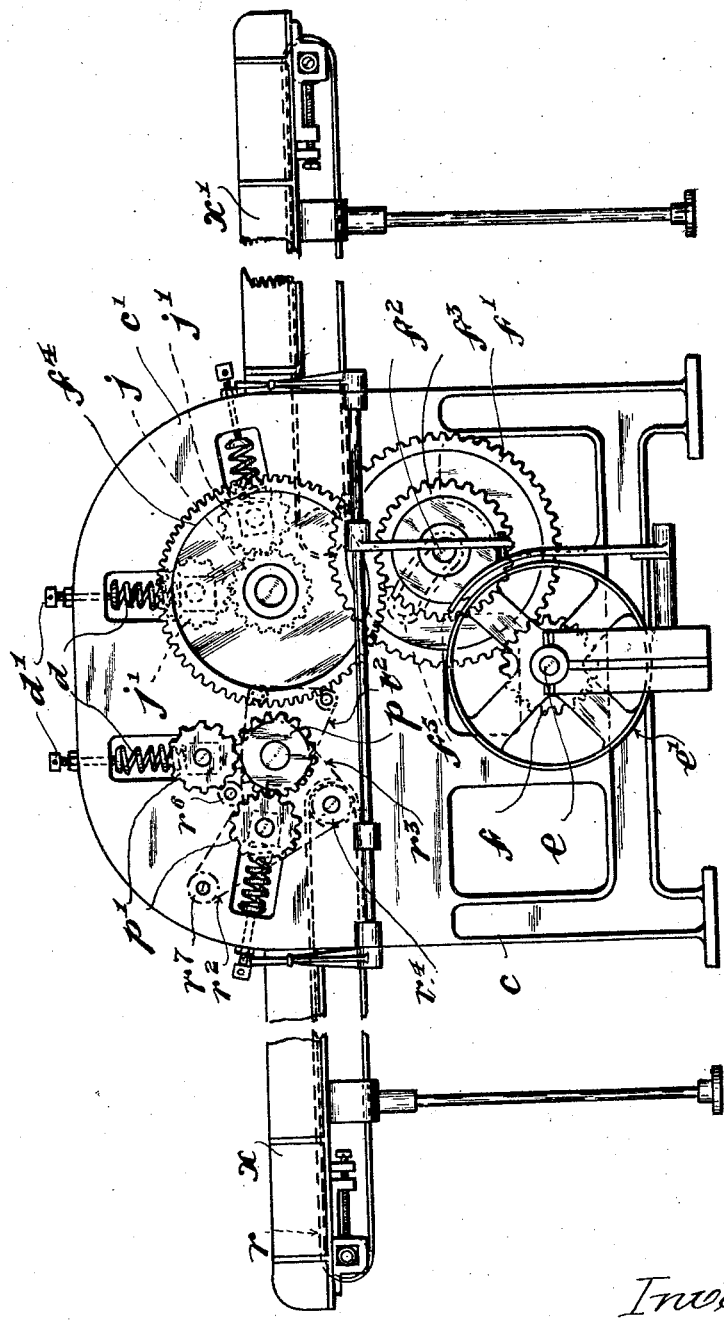
Figure 3:
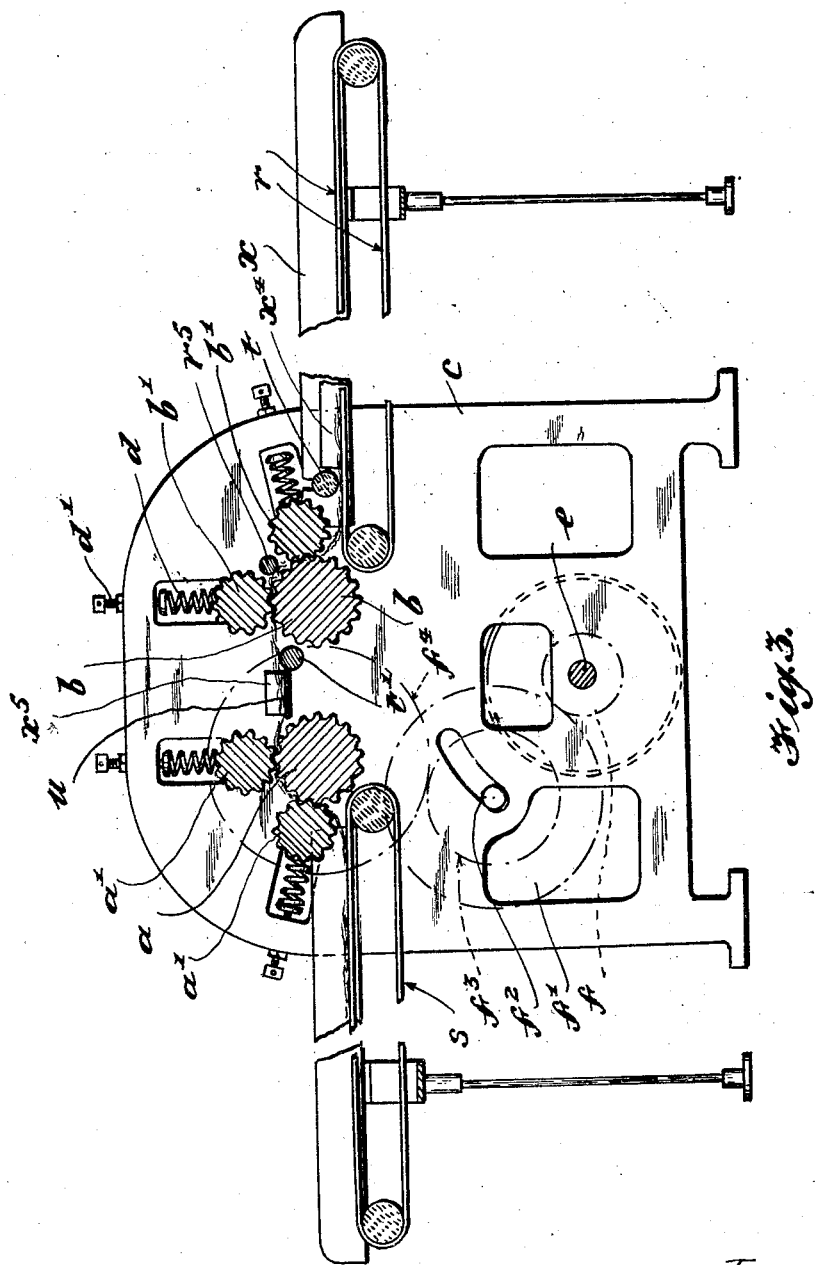
Figure 4:
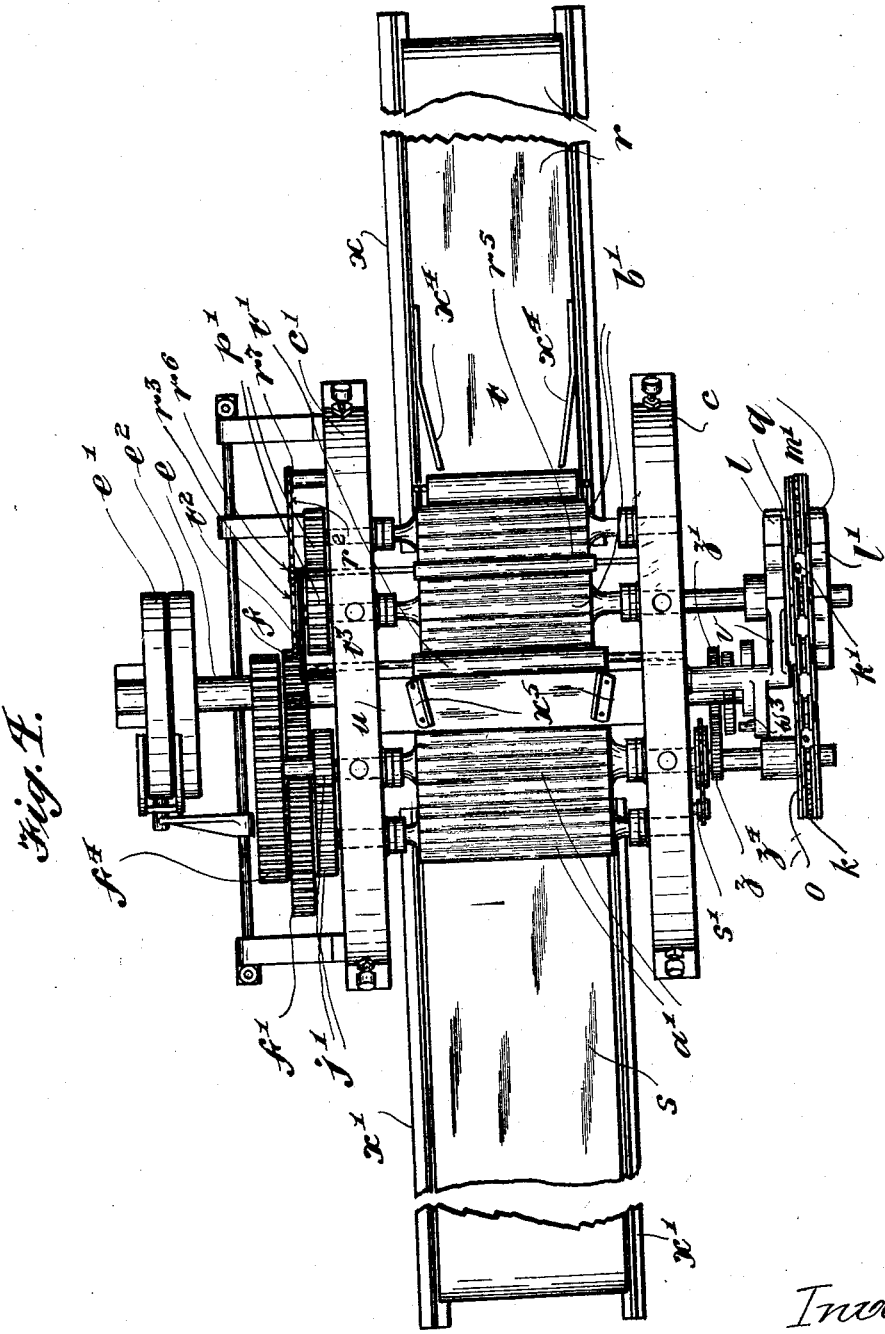
Figure 5:
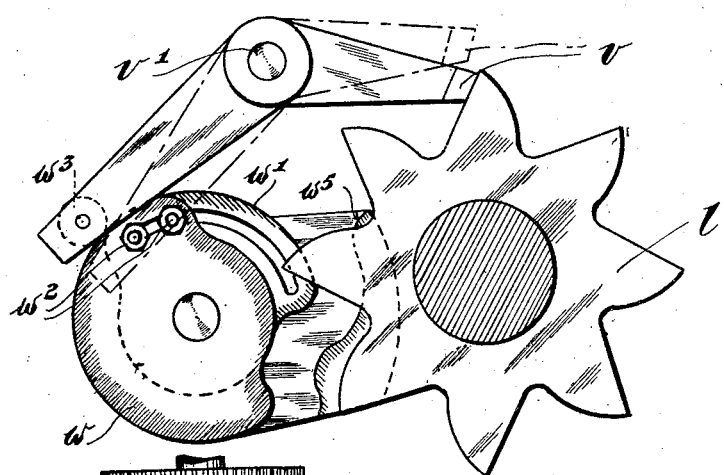
Figure 6:
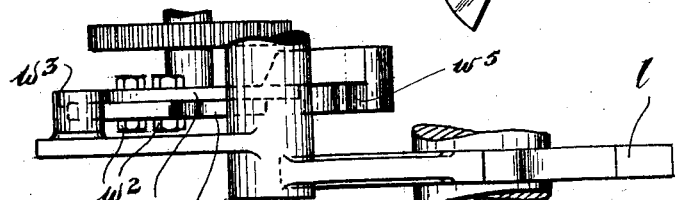
Figure 7:
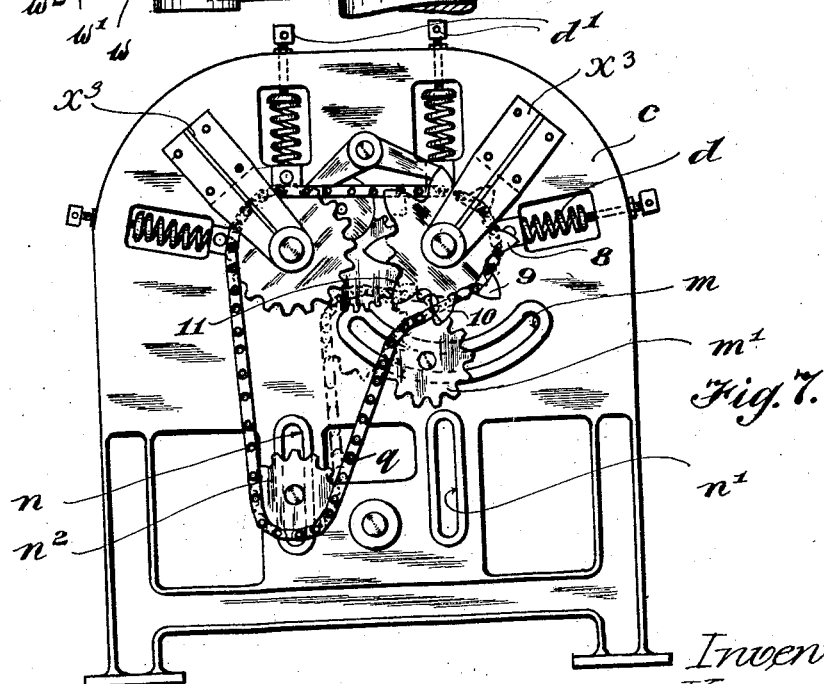

Figure 1 is an elevation of the machine.
Figure 2 is a rear elevation.
Figure 3 is a sectional elevation, and
Figure 4 is a plan view thereof.
Figures 5 and 6 illustrate respectively elevation and plan view to a larger scale, of the cam, finger, and star wheel controlling the intermittently actuated rollers.
Figure 7 is an elevation of part of the machine showing the adjustment effected for breaking or tearing the strick into longer pieces than would be effected with the adjustment as shown in Figure 1.

Referring to the drawings:—

The continuously driven rollers, hereafter referred to as the delivery rollers, comprise a central roller $a$, see Figure 3, and two smaller rollers $a^1$, $a^1$ and the intermittently driven rollers, or feed rollers, comprise a central roller $b$ and two smaller rollers $b^1$, $b^1$. Those rollers are fluted or corrugated longitudinally and are mounted between the gables or frame $c$ and $c^1$ the smaller rollers being mounted in bearing blocks capable of a radial adjustment with respect to the central rollers and loaded by helical springs $d$ the tension of which can be regulated by the screws $d^1$.

Extending between the gables $c$, $c^1$, near the foot thereof is the power shaft $e$ provided with the fast and loose pulleys $e^1$, $e^2$. Secured on this shaft is a spur wheel $f$, see Figure 2, which meshes with spur wheel $f^1$ mounted on a stud $f^2$. On the spur wheel $f^1$ is also secured the spur wheel $f^3$ which meshes with the spur wheel $f^4$ fast on the shaft of the central roller $a$ of the delivery rollers.

Also secured on the shaft of this roller is the spur wheel $j$ with which mesh the spur wheels $j^1$, $j^1$, on the shafts of the other two rollers $a^1$, $a^1$ of this group.

On the other side of the machine, see Figure 1, a sprocket wheel $k$ is secured on the shaft of the central delivery roller $a$.

On the shaft of the central roller $b$ of the intermittently driven or feed roller is loosely mounted a sprocket wheel $k^1$ and on each side thereof are secured the two star wheels $l$, $l^1$, Fig. 4. Adjustably secured in one of the slots $n$, $n^1$, provided in the gable $c$, is an idle sprocket or jockey wheel $n^2$ and in the radial slot $m$ is a similar wheel $m^1$.

An endless chain $o$, see Figures 1 and 7, passes over the sprocket wheels $k$, $k^1$ and idle wheels $n^2$ and $m^1$.

A spur wheel $p$, see Figure 2, is secured to the shaft of the central roller $b$ and with which mesh the two spur wheels $p^1$, $p^1$ on the shaft of the other two rollers of the group.

Two projections $q$ are provided on the chain $o$ and which are arranged to co-act with the star wheels $l$, $l^1$.

On power being transmitted through the fast pulley $e^1$ to the shaft $e$ the constantly driven group of delivery rollers $a$, $a^1$, $a^1$, are driven through the train of gearing $f$, $f^1$, $f^3$, $f^4$ and spur wheels $j$, $j^1$ $j^1$. The sprocket wheel $k$, see Figures 1 and 4, is also constantly driven and through the chain $o$ drives the sprocket wheel $k^1$ which, being loose on its shaft, does not drive the feed rollers.

The pins $q$ in chain $o$, see Figures 1, 4 and 7, intermittently co-act with the star wheels $l$, $l^1$ and impart a partial rotation thereto and therefore to the central roller $b$ of the feed rollers and through the spur wheels $p$, $p^1$ $p^1$ also drive the smaller rollers $b^1$, $b^1$ of the group.

An endless band $r$, see Figures 1, 2, 3 and 4, supported between the side frames $x$, to which guide plates $x^4$ are secured is provided to feed the material to the intermittently driven or feed rollers and a similar endless band $s$ provided to deliver the broken or torn strick. Band $r$ is driven by means of a chain $r^2$, see Figure 2, passing over a sprocket wheel $r^3$ on the shaft of the roller $b$ and over sprocket wheel $r^4$ secured on the inner roller over which said band passes. $r^6$ is a sprocket wheel driven by said chain $r^2$ and secured on the spindle of a guide roller $r^5$. An adjustable jockey sprocket wheel $r^7$ is provided for the chain $r^2$.

Likewise the delivery band $s$ supported between the side frames $x^1$ is driven by means of a chain $s^1$, see Figure 1, passing over the sprocket wheel $s^2$ secured to the shaft of roller $a$, idle sprocket jockey wheel $s^3$ and sprocket wheel $s^4$ on the inner roller of the delivery belt.

It will be noted that the delivery band is thereby constantly driven and feed band intermittently driven.

A loosely mounted feed roller $t$, carried between the frames $x$, see Figures 3 and 4, acts as a guard for the fingers of the operator when spreading the material prior to same passing between the rollers.

A guide roller $t^1$, see Figures 3 and 4, driven by means of a chain $t^2$, see Figure 2, from a second sprocket wheel $t^3$ secured on the shaft of roller $b$ serves to feed the material over the dead plate $u$ to the constantly driven rollers $a$, $a^1$, $a^1$. Guiding pieces $x^5$ are secured to said plate $u$.

To effect the positive arrestment of the intermittently driven feed rollers $b$, $b^1$, $b^1$ whenever the projections $q$ clear the star wheels $l$, $l^1$ a cam operated finger $v$ co-acts with the star wheel $l^1$ as shown in Figures 5 and 6 wherein said finger $v$ forms part of the rocking lever secured to a stud $v^1$ and operated by the cam. This cam is in two portions $w$ and $w^1$ which are adjustable with respect to each other so that the contour thereof can be varied, nuts $w^2$ securing the parts rigidly in position. A bowl $w^3$ carried by lever $v$ co-acts with the contour of the cam. Said cam $w$, $w^1$ is preferably provided with a guide member or surface $w^5$ arranged to co-act with the bowl and positively force same into the depression in the cam surface and thereby positively raise the finger out of engagement with the star wheel.

The chain dotted lines, Figure 5, show the finger in the latter position. Alternatively a helical spring (not shown) secured to said rocking lever and to the gable $c^1$ may be provided to actuate the finger against the action of the cam. One side of each tooth of the star wheel $l^1$ is cut to form a flat surface with which the finger can co-operate.

Said cam is driven by means of a spur wheel $z$, see Figures 1 and 4, fast on the shaft of delivery roller $a$ and which meshes with a spur wheel $z^1$ carried by a stud $z^2$. Fastened to the spur wheel $z^1$ is a pinion $z^3$ which meshes with a spur wheel $z^4$ to which is secured the said cam.

In operation the fiber is placed on the travelling band $r$, see Figure 3, passes below the roller $t$ and then passes to the feed rollers $b$, $b^1$, $b^1$, the roller $r^5$ serving to guide the fiber between the main feed roller $b$ and upper feed roller $b^1$ of this group. The fiber is then delivered to the dead plate $u$ and then to the delivery rollers $a$, $a^1$, $a^1$, the small roller $t^1$ aiding the fiber in its passage to and over the said plate.

In Figure 3 the material is indicated passing through the machine.

This passage of the fiber between the feed rollers $b$, $b^1$, $b^1$, only takes place when the latter are driven by the projections $q$ co-acting with and driving the star wheels $l$, $l^1$. Whenever the projections clear the star wheels the feed rollers are no longer driven but are positively arrested by the said finger co-acting with the star wheel $l^1$. The delivery rollers continue to rotate and owing to the stationary feed rollers gripping the fiber between them the fiber is consequently broken or torn. The broken or torn fiber is then fed by the delivery rollers to the band $s$, which latter delivers the material into a receptacle or otherwise as desired.

When the projections $q$ again co-act with the star wheels $l$, $l^1$, and the said finger $v$ being previously raised by the cam $w$, $w^1$ the feed rollers $b$, $b^1$, $b^1$ feed forward a further length of fiber which is likewise broken or torn by the action of the two groups of rollers.

The length of the broken or torn fiber depends on the extent the feed rollers are rotated each time the projections $q$ co-act with the star wheels.

In Figure 1 the projections $q$ on chain $o$ are about to co-act with the teeth 8 of the star wheels and will rotate the latter a little more than a quarter of a revolution. By passing the chain $o$ around the other side of the idle sprocket wheel $m^1$, as indicated in chain dotted lines Figure 1, said projections will engage with the previous teeth 9 of the star wheels thereby rotating the latter to a correspondingly greater extent and breaking the fiber into longer lengths. The idle sprocket wheel $n^2$ is adjusted in the slot $n^1$ in gable $c^1$ to take up the slack of the chain.

By altering the position of the idle wheel $m^1$ in its slot $m$ in gable $c^1$ and transferring idle wheel $n^2$ to the other vertical slot $n$ in gable $c^1$ the projections $q$ can be made to engage the teeth 10 of the star wheels $l$, $l^1$ and therefore rotate the feed rollers to a greater extent with a consequent increase in the length of the fiber broken or torn. The full lines Figure 7 indicate the position of the wheels $m^1$ and $n^2$ and the chain in this third position.

By moving the wheel $m^1$ still farther along its slot as shown in chain dotted lines Figure 7 the projections can be made to engage the teeth 11 of the star wheels and thereby further increase the length of the broken or torn fiber.

It will be understood that with each of such adjustments a corresponding adjustment must be made in the cam $w$, $w^1$ by altering the relative position of the cam members so that the cam operates to raise the finger clear of the star wheel just prior to the projections co-acting therewith and also to again lower the finger to positively stop the rotation of the feed rollers when they cease to be driven.

The gearing whereby the rollers are driven may be altered to give a greater or smaller output of broken pieces per minute by substituting a greater or smaller spur wheel for the spur wheel $f^3$, the stud $f^2$ being accommodated in a slot $f^5$ in gable $c$ to enable such adjustment to be effected.

The supporting brackets $x^3$ for the ends of the shafts of rollers $a$ and $b$ and shown in Figures 1 and 7 are omitted in Figure 4, for the purpose of clearness.

What I claim is:—

1. A machine of the character described comprising two groups of rollers, gearing for driving one group of rollers continuously, an endless flexible band arranged to intermittently drive the other group of rollers and means to positively stop the rotation of the latter group when not being driven.

2. In a machine of the character described, the combination with two groups of rollers, of gearing for continuously driving one group of rollers, an endless chain, gearing for driving said chain continuously, a projection carried by said chain, a star wheel with which said projection intermittently co-operates and operatively connected to the second group of rollers and means for positively stopping the rotation of the second group of rollers when not being driven.

3. In a machine of the class described, the combination with two groups of rollers, of gearing for continuously driving one group of rollers, an endless chain, gearing for driving said chain continuously, a projection carried by said chain, a star wheel with which said projection intermittently co-operates and operatively connected to the second group of rollers, a finger arranged to intermittently co-act with said star wheel and stop the rotation thereof when not being driven and a cam to operate said finger.

4. In a machine of the class described, the combination with two groups of rollers, of gearing for driving one group continuously, an endless chain having driving means therefor, adjustable idle sprocket wheels for said chain, a projection carried by said chain, a star wheel with which said projection co-operates and operatively connected to the second group of rollers, and means for positively arresting the operation of the second group of rollers when not being driven.

5. In a machine of the character described, the combination with two groups of rollers, of gearing for driving the one group continuously, an endless chain, gearing for driving said chain, adjustable idle sprocket wheels for said chain, a projection carried by said chain, a star wheel with which said projection co-operates and operatively connected to the second group of rollers, a finger arranged to intermittently co-act with said star wheel to stop the rotation thereof and a cam to intermittently operate said finger.

6. A machine of the class described comprising two groups of rollers, an endless chain drive, a projection carried by said chain, a star wheel operatively connected to the one group of rollers and with which said projection intermittently co-acts and means for positively stopping the rotation of said last mentioned group of rollers when not being driven.

7. A machine of the character described comprising supporting gables, two groups of rollers extending between said gables, gearing for continuously driving the one group of rollers, an endless chain driven by said gearing, idle adjustable guide sprocket wheels for said chain, a projection carried by said chain, a star wheel operatively connected to the other group of rollers and with which said projection intermittently co-acts and rotates, a finger arranged to intermittently co-act with and stop said star wheel and a cam driven by said gearing to operate said finger.

8. A machine of the class described comprising supporting gables, two groups of rollers extending between said gables, gearing for continuously driving one group of rollers, an endless chain driven by said gearing, an idle adjustable guide sprocket wheel for said chain, a projection carried by said chain, a star wheel operatively connected to the other group of rollers and with which said projection intermittently co-acts and rotates, a finger arranged to intermittently co-act with and stop said star wheel, a cam driven by said gearing to operate said finger, an endless feed belt for delivering material to the intermittently driven rollers, and a second endless belt to deliver the torn or broken material from the continuously driven group of rollers.

JAMES KNOX.